(12) United States Patent
Michel et al.

(10) Patent No.: US 10,446,185 B2
(45) Date of Patent: Oct. 15, 2019

(54) PHASE SLIP RECOVERY

(71) Applicant: Seagate Technology LLC, Cupertino, CA (US)

(72) Inventors: Richard P. Michel, Minneapolis, MN (US); Michael J. Link, Saint Paul, MN (US); Anand R. Kharpate, Bloomington, MN (US); Guofang Xu, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 45 days.

(21) Appl. No.: 15/707,396

(22) Filed: Sep. 18, 2017

(65) Prior Publication Data

US 2019/0088286 A1   Mar. 21, 2019

(51) Int. Cl.
*G11B 20/18* (2006.01)
*G11B 20/10* (2006.01)
*G06F 11/08* (2006.01)

(52) U.S. Cl.
CPC ........ *G11B 20/18* (2013.01); *G11B 20/10268* (2013.01); *G11B 20/10527* (2013.01); *G11B 20/1833* (2013.01); *G06F 11/08* (2013.01)

(58) Field of Classification Search
CPC .................................................. G11B 20/1833
USPC ......................................................... 714/769
See application file for complete search history.

(56) References Cited

U.S. PATENT DOCUMENTS

| 8,301,948 | B2 | 10/2012 | Blaum et al. | |
| 8,907,961 | B2* | 12/2014 | Schick | H04N 1/00132 345/530 |
| 2004/0221315 | A1* | 11/2004 | Kobayashi | G06F 3/14 725/126 |
| 2007/0201492 | A1* | 8/2007 | Kobayashi | G06F 3/14 370/395.64 |
| 2009/0002868 | A1* | 1/2009 | Mallary | B82Y 10/00 360/55 |
| 2009/0003144 | A1* | 1/2009 | Mallary | B82Y 10/00 369/30.21 |

* cited by examiner

*Primary Examiner* — Fritz Alphonse
(74) *Attorney, Agent, or Firm* — Mueting, Raasch & Gebhardt, P.A.

(57) ABSTRACT

Systems, devices, and method for phase slip recovery may include reading a plurality of data portions of a data block and positioning a mask over one or more data portions of the data block. The data portions following the mask may be shifted to provide a masked, reframed data block, and then the data block may be attempted to be decoded, which may be repeated until the data block is decoded.

20 Claims, 6 Drawing Sheets

PHASE SLIP RECOVERY

The disclosure herein relates to the phase slip recovery, and further to systems and devices for performing and implementing such phase slip recovery.

SUMMARY

One exemplary device may include a storage medium and a controller comprising one or more processors and be operably coupled to the storage medium. In at least one embodiment, the device may provide heat-assisted magnetic recording (HAMR). The storage medium may include a plurality of data blocks (e.g., sectors), and each of the data blocks may include a plurality of data portions. The controller may be configured to read a plurality of data portions comprising a data block and at least one buffered data portion following the data block from the storage medium, the data block comprising a phase slip, identify the location of the phase slip within the data block, position a mask (e.g., a mask defining a size that is less than or equal to the data decoding ability of the controller) on, or over, one or more data portions within the data block including the location of the phase slip (e.g., centered on one or more data portions within the data block to be centered about the location of the phase slip), and shift the plurality of data portions following the location of the phase slip to provide a masked, reframed data block and attempt to decode the masked, reframed data block until the masked, reframed data block is decoded.

One exemplary device may include a storage medium and a controller comprising one or more processors and be operably coupled to the storage medium. In at least one embodiment, the device may provide heat-assisted magnetic recording (HAMR). The storage medium may include a plurality of data blocks (e.g., sectors), and each of the data blocks may include a plurality of data portions. The controller may be configured to read a plurality of data portions comprising a data block and at least one buffered data portion following the data block from the storage medium, the data block comprising a phase slip, position a mask (e.g., a mask defining a size that is less than or equal to the decoding ability of the controller) on one or more data portions at one or more locations within the data block, and, for each location that the mask is positioned, shift the plurality of data portions following a middle of the mask to provide a masked, reframed data block and attempt to decode the masked, reframed data block until the masked, reframed data block is decoded or an amount of shifts exceeds the size of the mask.

One exemplary system may include a storage medium and a controller comprising one or more processors and be operably coupled to the storage medium. In at least one embodiment, the device may provide heat-assisted magnetic recording (HAMR). The storage medium may include a plurality of data blocks (e.g., sectors), and each of the data blocks may include a plurality of data portions. The controller may be configured to read a plurality of data portions comprising a data block and at least one buffered data portion following the data block from the storage medium, the data block comprising a phase slip and generate one or more masked, reframed data blocks based on the plurality of data portions and attempt to decode each of the one or more masked, reframed data blocks until the masked, reframed data block is decoded.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

DETAILED DESCRIPTION

Exemplary systems, devices, and methods shall be described with reference to FIGS. 1-8. It will be apparent to one skilled in the art that elements or processes from one embodiment may be used in combination with elements or processes of the other embodiments, and that the possible embodiments of such systems, devices, and methods using combinations of features set forth herein is not limited to the specific embodiments shown in the figures and/or described herein. Further, it will be recognized that timing of the processes and the size and shape of various elements herein may be modified but still fall within the scope of the present disclosure, although certain timings, one or more shapes and/or sizes, or types of elements, may be advantageous over others.

When data is read by a storage device from a storage medium (e.g., a magnetic disk), the read data may include one or more errors that may be corrected through error correction. Some of such errors may be caused by one or more of defects in the storage medium or mode hopping during writing of the data to the storage medium. In heat-assisted magnetic recording (HAMR), for example, the writer may cause a bit shift in data being written to the storage medium, and thus, the read-back sampling of the data from the storage medium may not be able to be decoded.

For instance, during writing and reading, the frequency of the writer and reader must be synchronized to the spin speed of the storage medium. Due to various reasons (e.g., environmental factors, temperature of the write head, power issues, mode hopping of the laser in HAMR, etc.), the frequency of the writer during writing may not be adequately synchronized with the spin speed of the storage medium. The data written by the writer when the frequency of the writer is not adequately synchronized may contain "phase slip" when read by a reader that is not adequately synchronized with the spin speed of the storage medium. In other words, a synchronized sampling of a readback waveform may shift by a small number of cycles due to the phase slip. Further, the spot size for data such as a bit or string of bits may be change, which may result in a phase slip.

A "phase slip" in a data block (e.g., a sector) written to a storage medium may be described as one or more data portions (e.g., one or more bits, one or more bytes, etc.) of the data blocks that appear to have been "skipped" or one or more data portions that appear to have been "added" when being read such that the read data block appears to have a different amount of data than was written (e.g., the read data may appear to be missing or including one or more data portions). Further, the data portions following the "phase slipped" data portions (e.g., the apparently "missing" data portions and/or "added" data portions) may be errantly shifted in view of the "phase slipped" data portions to the wrong locations within the data block. For example, it may be described that all the data portions following a phase slip, and thus "skipped" or "added" data portions, may be "shifted" towards the locations where the "skipped" data portions should have been or away from locations where the "added" data portions have been added. In other words, a "phase slip" may represent a discontinuity (e.g., a negative or positive discontinuity) within a sampled data block where the discontinuity has an unknown size (e.g., one or more data portions).

Since the phase slip may result in one or more data portions effectively being shifted into errant locations within a data block thereby resulting in errors in every data portion following the phase slip, decoding by conventional decoders may be challenging (e.g., the amount of errors may exceed the power of the conventional decoders).

This disclosure described herein includes systems, devices, and methods for phase slip recovery when reading and decoding data including a phase slip. More specifically, the systems, devices, and methods may use a mask together with re-framing of buffered samples to decode data including a phase slip. Further, the exemplary systems, devices, and methods may be advantageous over previous error recovery approaches that may focus on re-reading data samples from the media using various channel setting that controlled the sample acquisition because, e.g., such approaches may be slow, may consume needed resources, may be unable to recover the data including the phase slip, etc.

Figure 1:
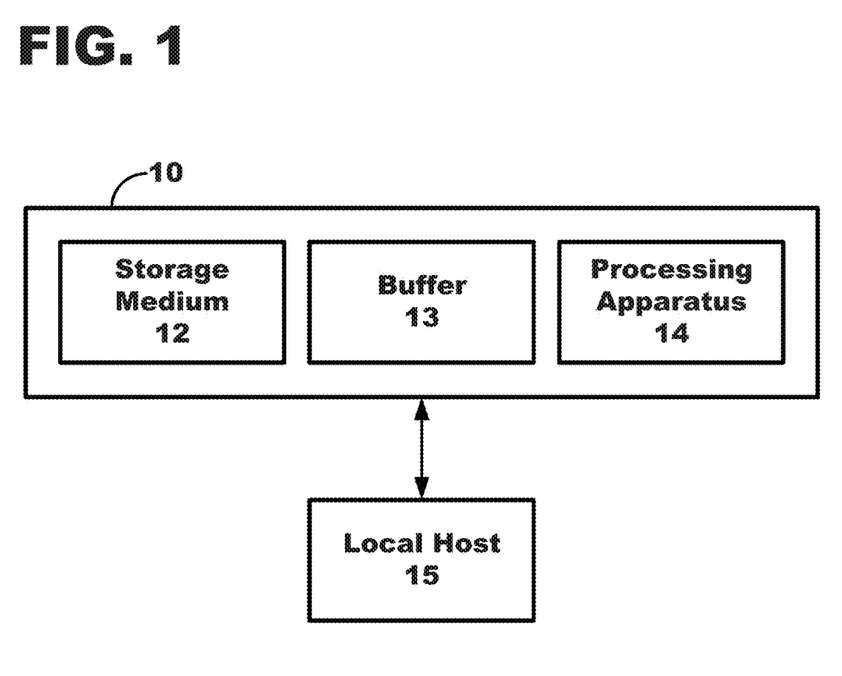
FIG. 1 is a block diagram including an exemplary system for use in reading and decoding data from a storage medium.

An exemplary device 10 (e.g., data device) that can be used in the embodiments described herein are depicted in FIG. 1. The exemplary device 10 may be operably coupled to a local host 15, e.g., for transferring data therebetween. For example, the local host 15 may request data from the device 10, and in turn, the device 10 may provide such requested data to the local host 15. In at least one embodiment, the local host 15 is a computer (such as, e.g., a personal computer, server, etc.).

The device 10 includes a storage medium 12, a buffer 13 (e.g., for temporarily storing data during read and write operations, during decoding of sampled dated, etc.), and a controller, or processing apparatus, 14 that is operably coupled (e.g., electrically coupled to transmit data therebetween) to the storage medium 12 and the buffer 13. The systems, devices, and methods disclosed herein may be generally described in the context of an exemplary device 10 and/or systems including an exemplary device 10, but that should in no way be taken as limiting the scope of the present disclosure. Generally, a device 10 may be any device and/or apparatus in which data may be written to the storage medium 12, and then read back from the storage medium 12.

The storage medium 12 may be any device and/or apparatus configured to store a plurality of data blocks, or sectors of data, (e.g., binary data), each block containing a plurality of data portions of data. The storage medium 12 can include, but is not necessarily limited to, solid state memory, hard magnetic discs, floppy discs, magnetic tapes, optical discs, integrated circuits, volatile memory, nonvolatile memory, etc. Generally, the plurality of data blocks, or blocks of data, 16 may be contained in non-volatile memory.

In at least one embodiment, the storage medium 12 may include one or more magnetic discs. Each disc in an exemplary storage medium 12 may include a surface having a plurality of substantially concentric circular tracks, or data tracks. In some embodiments, the data tracks on a magnetic disc-based storage medium 12 are logically divided into a plurality of data storage sectors or data portions. Each storage sector or portion may be identified and located at various positions on disc. In the disc-type storage medium example illustrated, the sectors, may be "pie-shaped" angular sections of a track that are bounded on two sides by radii of the disc and on the other side by the perimeter of the circle that defines the track. In at least one embodiment, the device 10 is a heat-assisted magnetic recording (HAMR) device including all the components used to perform HAMR such as but not limited to, e.g., a laser configured to be used in conjunction with the write heads.

Each data block, or block of data, of the plurality of data blocks of the storage medium 12 may be generally described as including a plurality of data portions or cells. For example, each block of data may be subdivided in a plurality of data portions or cells. As defined herein, each data portion or cell is the basic unit of data storage on the storage medium 12. In at least one embodiment, for example, in connection with a magnetic disc, a data block may be referred to as a "sector."

Each data portion or cell in a data block may include one or more bits or bytes. In at least one embodiment, each data portion, or cell, in a data block contains 4096 bytes of data. In at least one embodiment, each data portion, or cell, in a data block contains 512 bytes of data. In at least one embodiment, each data portion, or cell, in a data block contains 2048 bytes of data. In at least one embodiment, each data portion, or cell, in a data block contains a single bit of data.

The controller 14 may include various circuitry, logic, memory, etc. for use in the reading, writing, and decoding data from the storage medium 12 and/or using the buffer 13 for at least such reading, writing, and decoding data. For example, the controller 14 may include one or more circuit components such as integrated circuits, processors, etc. that may be configured to interface with the storage medium 12 and the buffer 13 to read (e.g., including decoding) and write data therein. Among other things, the controller 14 may be configured to decode one or more data portions and/or data blocks read from the storage medium 12 that are determined to have "failed" and/or contain a phase shift. In other words, the controller 14 may be used for carrying out phase recovery from the storage medium 12. These read/write operations executed by the controller 14 may be performed directly on the storage medium 12 or through an optional read/write channel. The read/write channel may be configured to receive data from the controller 14 during a write operation, and provides encoded write data to the storage medium 12. During a read operation, the read/write channel may process a read signal in order to detect and decode data recorded on the storage medium 12.

The methods, techniques, and/or processes described in this disclosure, including those attributed to the controller including one or more processors, or various constituent components, may be implemented, at least in part, in hardware, software, firmware, or any combination thereof. For example, various aspects of the techniques may be implemented within one or more processors, including one or more microprocessors, DSPs, ASICs, FPGAs, or any other equivalent integrated or discrete logic circuitry, as well as any combinations of such components. The term "controller," "processing apparatus," "processor," or "processing circuitry" may generally refer to any of the foregoing logic circuitry, alone or in combination with other logic circuitry, or any other equivalent circuitry.

Such hardware, software, and/or firmware may be implemented within the same device or within separate devices to support the various operations and functions described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, the functionality ascribed to the systems, devices and techniques described in this disclosure may be embodied as instructions on a computer-readable medium such as RAM, ROM, NVRAM, EEPROM, FLASH memory, STRAM, RRAM, magnetic data storage media, optical data storage media, or the like. The instructions may be executed by one or more processors to support one or more aspects of the functionality described in this disclosure.

Generally, the exemplary systems, devices, and methods may utilize one or both of variable-length decoding and block-based decoding to decode failed blocks. Variable-length decoding may be defined as a technique that may use one or more algorithms and/or processes that may take a variable length of time to decode the failed data (e.g., failed data may be a read data portion including one or more errors). Exemplary variable-based decoding processes or techniques may include, e.g., forward error correction codes, low-density parity check (LDPC) codes, turbo codes, etc. Further, variable-length decoding may include iterative decoding, such as LDPC decoding. Such iterative decoding may not decode the failed data after a predetermined number (e.g., one, two, five, ten, etc.) of iterations of decoding and may require additional iterations of decoding. Block-based decoding may be defined as a decoding technique that may use one or more algorithms and/or processes for decoding a data block (e.g., an entire data block including more than one data portion). Exemplary block-based decoding algorithms and/or processes may utilize, e.g., Reed-Solomon codes, Hamming codes, single parity codes, interleaved codes, LDPC codes, etc. For example, block-based codes (for use in block-based decoding), such as outer codes (OC), may have the capability to correct a single or multiple sector/portion failures, irrespective of the type of the failure.

Figure 2:
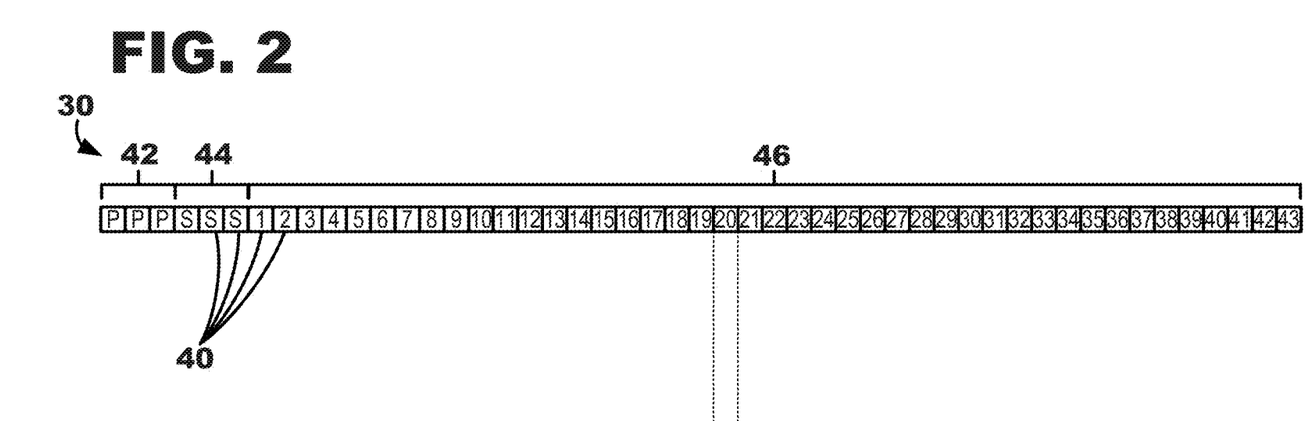
FIG. 2 is a diagrammatic representation of data block such as, e.g., a sector, to be read and decoded by, e.g., the system and devices of FIG. 1.

A diagrammatic representation of a data block 30 to be read and decoded by, e.g., the system and devices of FIG. 1, is depicted in FIG. 2. The data block 30 may include a plurality of data portions 32, some of which are labeled. Although as depicted, the data block 30 includes 49 data portions 40, it is to be understood that the data block 30 depicted is merely for exemplary purposes and that the exemplary systems, devices, and methods may be used with data blocks 30 including less than 49 data portions 40 and more than 49 data portions. In other words, the specific example depicted in the figures included herein is not limiting. In at least one embodiment, the data block 30 may be a sector of a data track on a storage medium such as, e.g., a 512-byte sector comprising 4096 user bits plus ECC overhead, a 2048-byte sector comprising 16384 user bits plus ECC overhead, a 4096-byte sector comprising 32768 user bits plus ECC overhead, etc. Each data portion 40 may be a bit within the sector.

The data block 30 depicted in FIG. 2 includes three types of data portions 40, namely, preamble data portions 42 for timing recovery acquisition and labeled with the letter "P," synchronization data portions 44 for storing synchronization data for reading data from the storage medium 12 and labeled with the letter "S", and data-storing data portions 46 for storing data on the storage medium 12 and numerically labeled sequentially. For the sake of this disclosure, only the data-storing data portions 46 will be considered as the data-storing data portions 46 are the portions of the data block 30 that are attempting be recovered using the exemplary systems, devices, and methods as further described herein. As such, it is to be understood that when referring to data portions 40 in the remainder of this disclosure, only data-storing data portions 46 are being considered and will often be referred to specifically by their numerical label.

Figure 3:
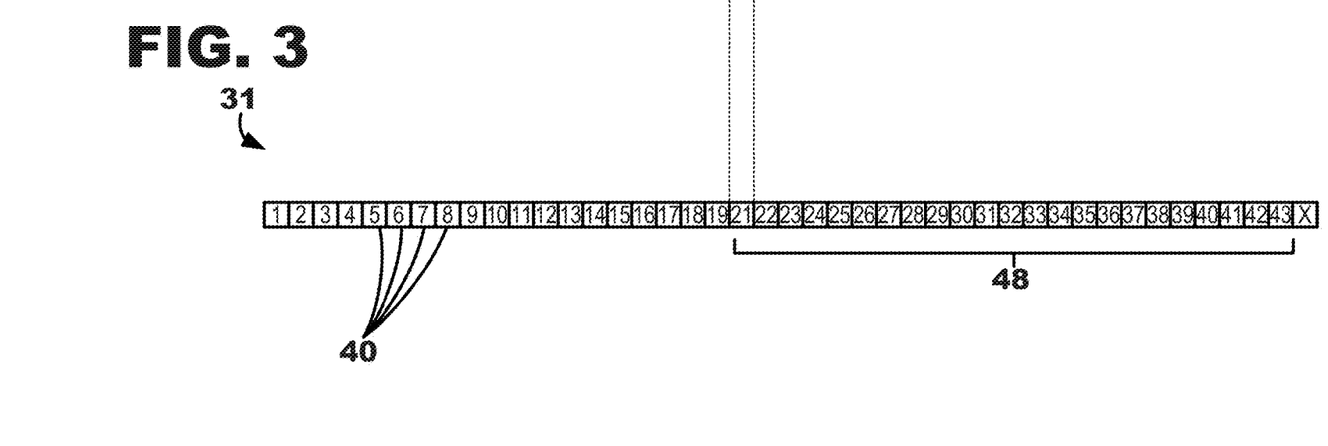
FIG. 3 is a diagrammatic representation of the data block of FIG. 2 including a phase slip.

When reading or sampling the data block 30 from a storage medium 12, a phase slip, or discontinuity, may be found within the read, or sampled, block 30, which may be the result of a defect in the storage medium 12, a result of mode hopping during writing of the data to the storage medium 12, etc. The sampled data block 31 of FIG. 3 is the data block 30 of FIG. 2 after sampling and including a phase slip. Further, the sampled data block 31 only depicts the data-storing data portions 46.

As shown, the sampled data block 31 of FIG. 3 is missing data portion 40 reference number 20, which may be due to a phase slip. Instead, the data portion reference number 21 is located where the data portion 40 reference number 20 should be located as indicated by the dashed lines extending from FIG. 2. Thus, the data portions 40 "skip" directly from the data portion 40 reference number 19 to the data portion 40 reference number 21. Thus, the "shifted," or errantly located, data portions 48 following the phase slip may be described as being shifted one data portion toward the beginning of the data block 31, and when decoded, will result in error since each of the shifted data portions 48 is not located in the location, or frame, within the data block 30 that they are expected. Since each shifted data portion 48 following the phase shift results in an error, it is likely that decoding of the block using, e.g., block-based decoding, may be ineffective since the number of shifted data portions 48 following the phase shift likely exceeds the power of the decoder. Further, if the error-correction code is after the phase slip (e.g., at the end of the data block 31), the error-correction code itself may have been incorrectly "framed" due to the shift of the shifted data portions 48 following the phase slip, and thus, the error-correction code may certainly not work. For example, the end of the data block 31 may include data portion 40 reference number X, which may not be supposed to be part of the data block 31 but was sampled because the data portion 40 reference number 20 was "skipped." Although in this example in FIG. 3 the phase slip provided a "missing" data portion 40 reference number 20, it is to be understood that a phase slip may provide more than one single "missing" data portion 40 or may provide one or more additional data portions 40 that do not belong in the read data. Further, although the exemplary methods and processes are further described herein to be used to decode the data block 31 including the specific phase slip depicted in FIG. 3, it is to be understood that such methods and processes may be used to decode data including phase slips that are different than the phase slip shown in data block 31 of FIG. 3 (e.g., such as read data including more than a single "missing" data portion or one or more additional data portions).

Generally, the exemplary systems, devices, and methods may be described as recovering sampled data with a phase slip by oversampling (e.g., oversampling data beyond the requested data on the storage medium as opposed to oversampling the same data from the storage medium), and then using a mask together with reframing to find the correct sample configuration. In other words, a data vector longer than the length of the user data plus ECC in memory may be sampled, and the amount of data beyond the length of the user data plus ECC may be referred to as the "oversampling." Further, it may be described that during the sampling of the corrupted data, the exemplary systems, devices, and methods may direct the channel to collect extra samples beyond the standard number. The oversampling may give the algorithm re-framing options. A mask that is less than or equal to the max decoding (e.g., burst correction) capability of the code graph may be placed at the beginning of the buffered data, and the buffered samples may be re-framed before and/or following the erasure mask. The reframed data may be attempted to be decoded with each configuration. If the data is not decoded, the mask may be slid forward or backward through the data by an amount that is less than or equal to mask size. Then, the samples following the mask after each shift of the mask may be reframed and decoded. The decode will converge when the correct framing is found. If the location of the phase slip is known, then the mask can be positioned directly at the location of the phase slip.

Figure 4:
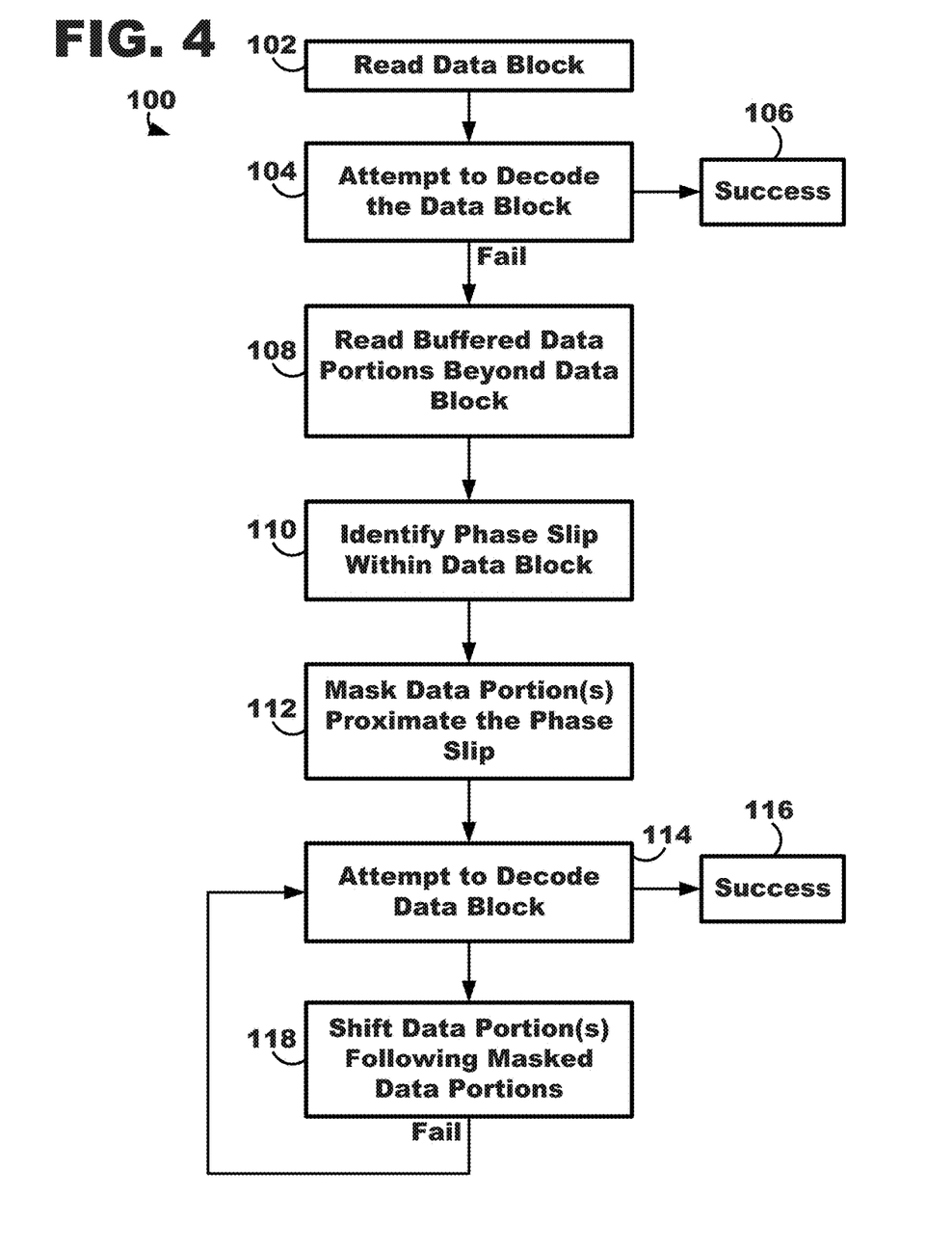
FIG. 4 is a flow diagram of an exemplary method of reading and decoding a data block having a phase slip executable by, e.g., the system and devices of FIG. 1.

An exemplary method 100 of reading and decoding a data block having a phase slip executable by the exemplary systems and devices described herein is depicted in FIG. 4. The method 100 may include reading a data block 102, and then attempting to decode the data block 104. If the data block is decoded, the method 100 ends in success 106. If the data block decoding fails, the method 100 may continue reading one or more data portions beyond the expected end of the data block 108, which may be referred to as buffered or oversampled data portions. Thus, the plurality of read data may include a data block 31 and at least one buffered data portion reference number "X" following the data block 31 as shown in FIG. 3. As previously shown and described, the data block 31 includes a phase slip between data portion 40 reference number 19 and data portion 40 reference number 21.

The exemplary method 100 may further identify the location of the phase slip 110 within the data block 31 using one or more processes or methods. For example, identification of location of the phase slip 110 may be performed by monitoring the filtered error signal which is derived from subtracting the equalized data from the expected data determined from Viterbi output and an equalization partial response target.

Figures 5, 6:
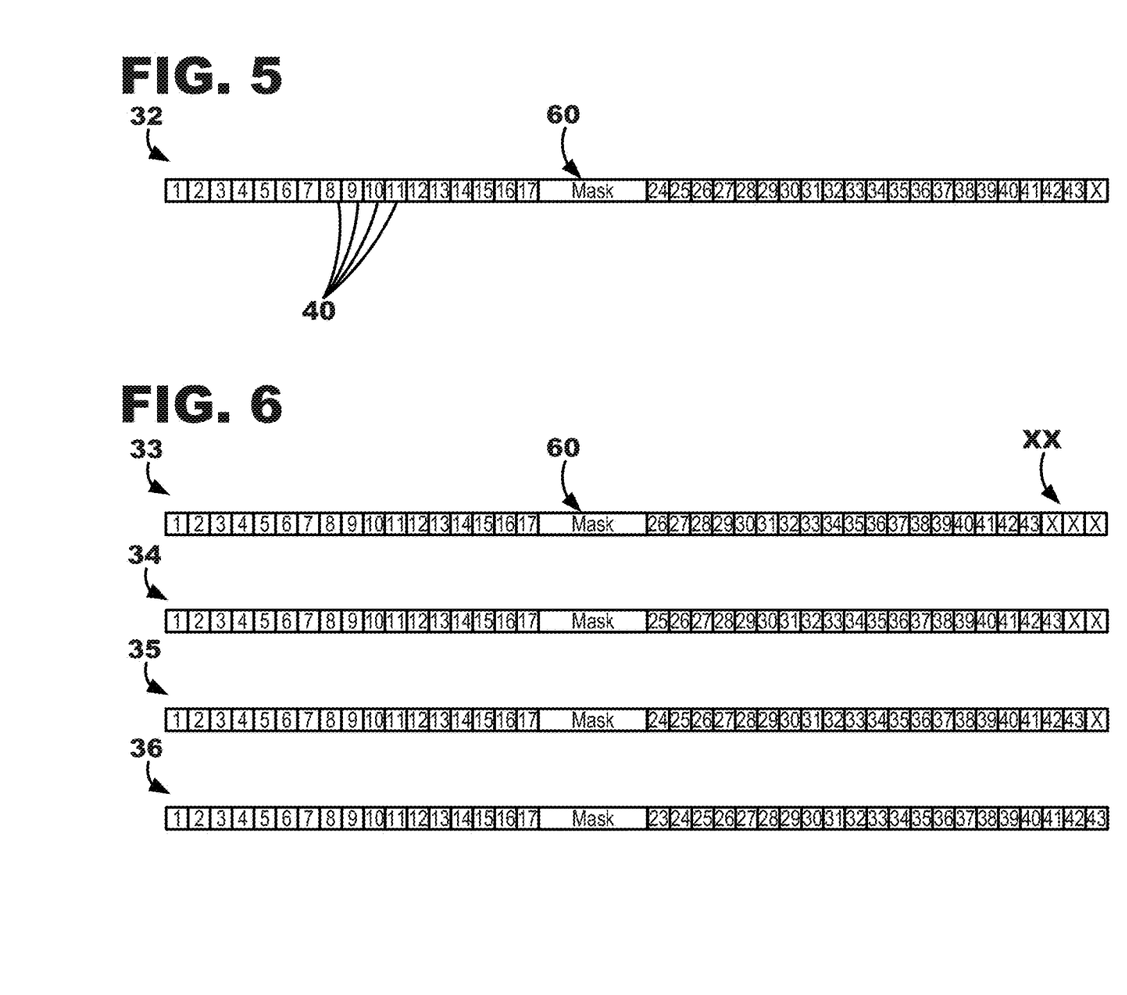
FIG. 5 is a diagrammatic representation of the data block of FIG. 2 when masking one or more data portions of the data block as described in the exemplary method of FIG. 4.
FIG. 6 are diagrammatic representations of the data block of FIG. 5 including the masked data portions when shifting the data portions following the masked data portions as described in the exemplary method of FIG. 4.

To recover from the phase slip, the method 100 may then position (e.g., temporarily position) a mask 60 on one or more data portions 112 within the data block 31 including the location of the phase slip to provide a masked data block 32 as shown in FIG. 5. The mask 60 may hide the data portions the mask 60 is thereon from the decoding process of the block 32. In other words, when decoding the masked data block 32, the masked data portions may be "missing" and the decoder may attempt to reconstruct the masked data portions using the error correction code(s). The mask 60 does not delete or remove the masked data portions 40 such that the masked data portions are not recoverable. Instead, the mask 60 may be described as merely temporarily "covering up" the masked data portions such that the decoder cannot "see" or use the masked data portions during decoding, and in fact, will attempt to reconstruct each of the masked data portions during decoding.

The mask 60 may be one or more or a plurality of data portions long. As shown, the mask 60 is five data portions long. Generally, the mask 60 may be any length that is less than or equal to the decoding power of the decoder that is decoding the data block 30. For example, the data block 30 may be a 4096-byte sector where each data portion 40 is 1 bit. If the decoding power of the decoder is 2000 bits, the mask 60 may be less than or equal to about 2000 bits long.

As described herein, the mask 60 may be described as being used to "hide," "ignore," or minimize the impact of the data portions 40 that the mask 60 "covers" such that the decoder may decode the masked data block 32 while assuming that the data portions 40 covered by the mask 60 need to be corrected or recovered using the decoder. In this way, the phase slipped area of the masked data block 32 may be covered by the mask 60, and thus, the masked data block 32 may be able to be reconstructed and/or recovered.

After masking the data portions 40 proximate the phase slip to provide a masked data block 32 as shown in FIG. 3, the exemplary method 100 may attempt to decode 114 the masked data block 32. If the data block is decoded 114, the method 100 ends in success 116. In one or more embodiments, the first attempt at decoding may not occur until a shift 118 occurs.

However, the data portions 48 following the expected phase slip may still be "shifted" such that, e.g., the data portions 48 following the phase slip may not be in the locations covered by the mask 60 during an attempt to decode the masked data block 32. In other words, the data portions 48 following the phase slip may be errantly located within the masked data block 32. Thus, the method 100 may further include shifting the plurality of data portions 48 following the location of the phase slip 118 to provide a first masked, reframed data block 33 as shown in FIG. 6.

For example, the data portions following the phase slip 48 are shifted two data portions to the "left," or towards the beginning of the data block, to provide the first masked, reframed data block 33 in FIG. 6. Since the data portions following the phase slip 48 have been shifted to the left two data portions, two additional buffered data portions reference X may be included as part of the masked, reframed data block 33, which now may be attempted to decoded 114. If the first masked, reframed data block 33 is decoded, the method 100 will complete in success 116.

If the data block decoding fails 114, the method 100 may return to shifting the data portions 48 following the phase shift a subsequent shift location that is different from the previous shift location in the first masked, reframed data block 33 to provide subsequent masked, reframed data blocks 34, 35, 36. The method 100 will continue to shift the plurality of data portions 48 following the location of the phase slip to provide a masked, reframed data block 118 and to attempt to decode the masked, reframed data block 114 until the masked, reframed data block is decoded ending in success 116.

More specifically, as shown in FIG. 6, data portions 48 following the phase slip have been shifted to the "left" one data portion to provide the second masked, reframed data block 34, which may be attempted to be decoded 114 but will end in failure in this example. The third masked, reframed data block 35 shown in FIG. 6 is the same as the original masked data block 32, which may be basically be described as not including a shift of the data portions 48 following the phase slip. In this embodiment, the original masked data block 32 had been attempted to be decoded prior to the first shift, and thus, decoding of this third masked, reframed data block 35 may be skipped in this embodiment. However, in other embodiments, where the original masked data block 32, which does not include any shifting, is not attempted to be decoded originally, the third masked, reframed data block 35 may be attempted to be decoded after the third iteration of "shifting" (even though it is technically not "shifted") but will also end in failure in this example.

Further, data portions 48 following the phase slip have been shifted to the "right" one data portion to provide the fourth masked, reframed data block 36 that when decoded will end in successful decoding 118. As shown, the mask length was five data portions, and the shift shown in the fourth masked, reframed data block 36 appropriately spaces the data portion 40 reference number 17 five data portions away from the data portion 40 reference number 23, which resulted in placing, or locating, the data portions 48 beyond the phase shift in their appropriate, or proper, locations such that decoding may be successful.

Although this example stopped at the fourth iteration (or third if the non-shifted masked data block 35 is "counted"), the exemplary method 100 may continue to provide one more iteration by where the data portions 48 following the phase slip are shifted to the "right" two data portion to provide a fifth masked, reframed data block. The number of iterations of shifting may be equal to the length of data portions of the mask 60. For example, if the mask 60 has a length of five data portions, then the method 100 may include five iterations of shifts (with, e.g., one of the iterations not being a shift as in the non-shifted masked data block 35).

In other words, the exemplary systems, devices, and methods may be described as using buffered error recovery to buffer additional samples beyond the expected end of the data, identifying the location of the phase slip, placing an erasure mask at the location of the phase slip, reframing the samples after the phase slip, and attempting to decode with each configuration. The decoding will converge when the correct framing is found.

The exemplary systems, devices, and methods may further be utilized without knowing the location of the phase slip within a failed sampled data block. Thus, the exemplary systems, devices, and methods may not need to identify the location of the phase slip within the failed sample data block to recover the data block. In these embodiments, the mask may be iteratively positioned along the data block starting at the beginning of the data block and moving along the data block until decoding is successful. For each mask position, the data portions following a middle location, or middle data portion, of the mask may be iteratively shifted by one data portion similar to the shifting with respect to exemplary method 100.

Figure 7:
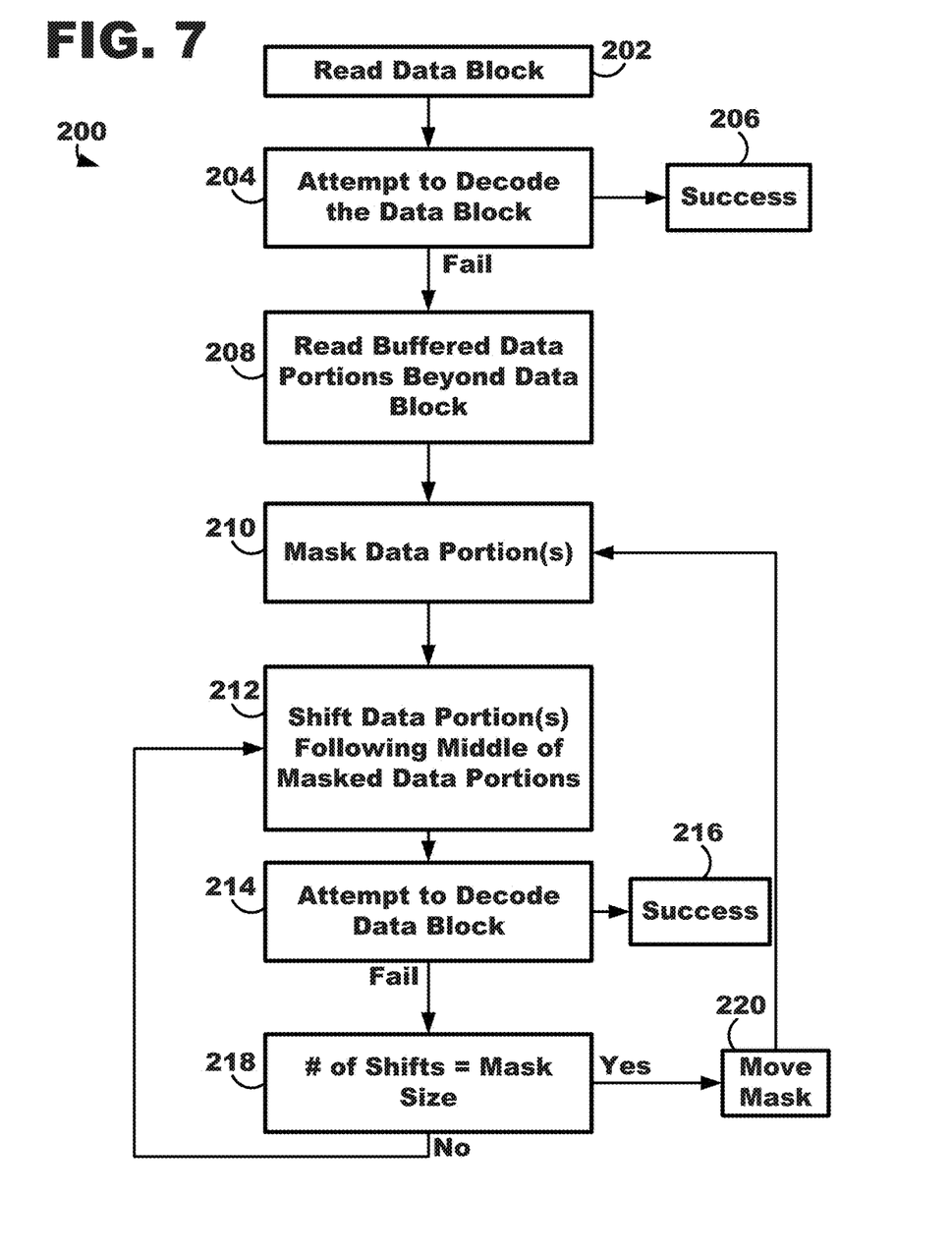
FIG. 7 is a flow diagram of another exemplary method of reading and decoding a data block having a phase slip executable by, e.g., the system and devices of FIG. 1.

An exemplary method 200 of reading and decoding a data block having a phase slip executable by the exemplary systems and devices described herein that does not use the location of the phase slip is depicted in FIG. 7. The method 200 may include reading a data block 202, and then attempting to decode the data block 204. If the data block is decoded, the method 200 ends in success 206. If the data block decoding fails, the method 200 may continue reading one or more data portions beyond the expected end of the data block 208, which may be referred to as buffered or oversampled data portions. Thus, the plurality of read data may include a data block 31 and at least one buffered data portion reference number X following the data block 31 as shown in FIG. 3. Although as shown, a single buffered data portion is depicted, the method 200 will likely read more than a single buffered data portion. In other words, the method 200 may read a plurality of buffered data portions following the end of the data block 31. For example, the amount of buffered data portions read after, or beyond, the data block 31 may be less than or equal to the mask size, which as described further herein may be less than or equal to the decoding (e.g., burst correction) ability of the controller to decode the data block 31.

As previously shown and described, the data block 31 includes a phase slip between data portion 40 reference number 19 and data portion 40 reference number 21. Unlike the exemplary method 100 described herein, the exemplary method 200 does not attempt to identify the location of the phase slip within the data block 31, and instead, proceeds to mask one or more data portions 210.

Figure 8:
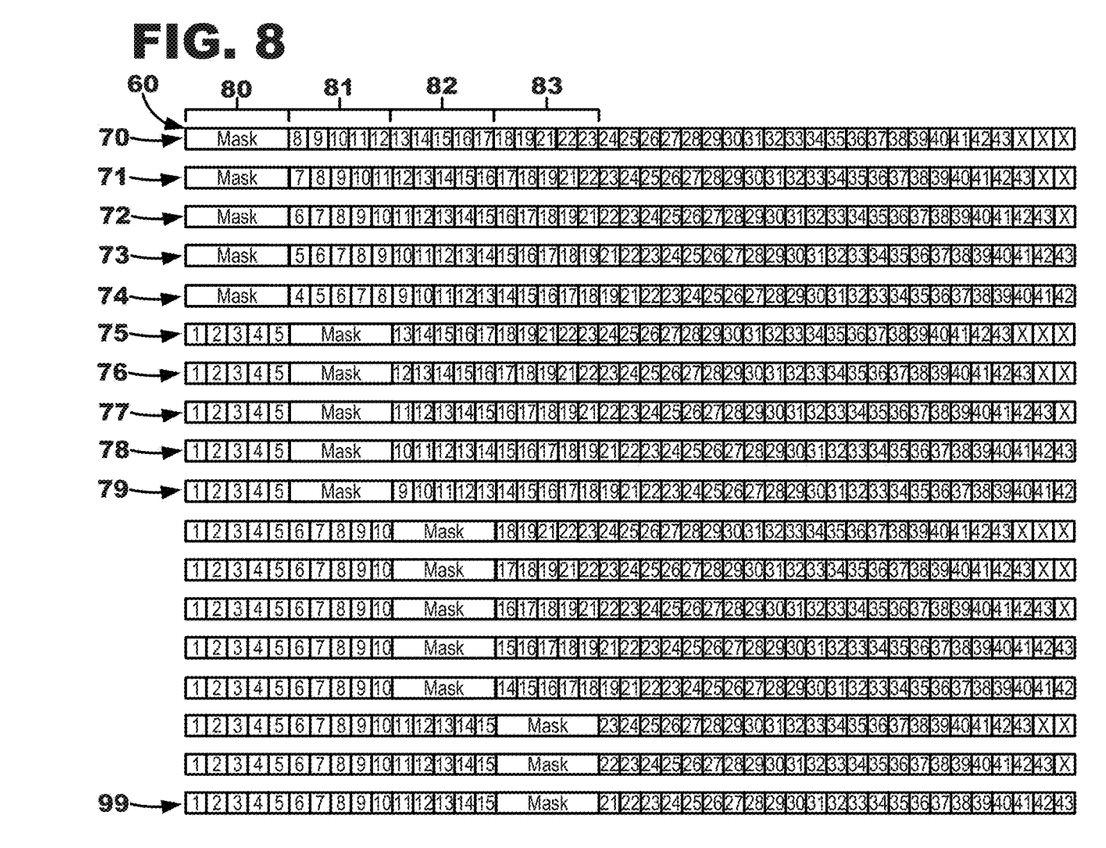
FIG. 8 are diagrammatic representations of the data block of FIG. 5 when masking one or more data portions of the data block, shifting the mask, and shifting the data portions following the masked data portions as described in the exemplary method of FIG. 7.

More specifically, the method 200 may position (e.g., temporarily position) a mask 60 on one or more data portions 112 at a first, or initial, location 80 within the data block 31 including to provide a masked data block 70 as shown in FIG. 8. The mask 60 may hide the data portions the mask 60 is thereon from the decoding process of the block 70. In other words, when decoding the masked data block 70, the masked data portions may be described as being "hidden," "ignored," or minimized so as to not be used during decoding, and the decoder may attempt to reconstruct the masked data portions using the error correction code(s). The mask 60 does not delete or remove the masked data portions such that the masked data portions are not recoverable. Instead, the mask 60 may be described as merely temporarily "covering up" the masked data portions such that the decoder does not use the masked data portions during decoding, and in fact, will attempt to reconstruct each of the masked data portions during decoding.

The mask 60 may be one or more or a plurality of data portions long. As shown, the mask 60 is five data portions long. In other words, the mask 60 may a define a length in amount of data portions. In this example, the length of the mask 60 may be five data portions. Generally, the mask 60 may be any length that is less than or equal to the decoding power (e.g., burst correction ability) of the decoder that is decoding the data block 30. For example, if the data block 30 is a 4096-byte sector, each data portion 40 is 1 bit, and the decoding power of the decoder is 1000 bits, the mask 60 may be less than or equal to about 1000 bits long.

As described herein, the mask 60 may be used to hide the data portions 40 that it covers such that the decoder may decode the masked data block 70 while assuming that the data portions 40 covered by the mask 60 need to be corrected or recovered using the decoder. In this way, if the mask 60 is covering the phase slipped area when positioned at the first, or initial, location 80, the masked data block 70 may be able to be reconstructed and/or recovered.

For each mask location 80, 81, 82, 83 . . . , the plurality of data portions following a middle spot, or location, within of the mask 60 may be shifted 212 to provide a masked, reframed data block. For instance, the data portions following the middle of the mask 60 at the first location 80 are shifted 212 two data portions to the "left," or towards the beginning of the data block, to provide the first masked, reframed data block 70 in FIG. 8. Since the data portions following the middle of the mask 60 have been shifted to the left two data portions (and, e.g., the phase slip follows the first location 80), three additional buffered data portions reference X may be included as part of the masked, reframed data block 70, which now may be attempted to decoded 214. If the first masked, reframed data block 70 is decoded 214, the method 200 will complete in success 216.

If the masked, reframed data block 70 is not successfully decoded 214, the exemplary method 200 may determine whether, for this mask location, which is location 80 at this point, whether the data portions following the middle of the mask 60 have been shifted that same amount of times as the size or length of the mask 60. More specifically, in this example, the length, or size, of the mask 60 is five data portions, and thus, the method 200 may determine if the data portions following the middle of the mask 60 have shifted 5 times. At this point, only a single shift as occurred to provide the first masked, reframed data block 70, and thus, the exemplary method 200 may return to shift the data portions following the middle of the mask 60 to provide another masked, reframed data block 70. In other words, for each mask location 80, 81, 82, 83 . . . , the exemplary method 200 may continue to shift 212 the data portions following the mask 60 until the masked, reframed data block is successfully decoded 214.

For example, the data portions following the middle of the mask 60 may be shifted to a subsequent shift location that is different from the previous shift location in the first masked, reframed data block 70 to provide subsequent masked, reframed data blocks 71, 72, 73, 75, and continue to attempt to decode the masked, reframed data blocks 214 until the masked, reframed data block is decoded ending in success 216 or the amount, or number, of shifts exceed the length of the mask 60.

More specifically, as shown in FIG. 8, data portions following the middle of the mask have been shifted to the "left" one data portion to provide the second masked, reframed data block 71, which may be attempted to be decoded 214 but will end in failure. The third masked, reframed data block 72 shown in FIG. 8 include no, or zero, shift of the data portions following the middle of the mask 60, which may be attempted to be decoded but will also end in failure. Further, data portions following the middle of the mask 60, have been shifted to the "right" one data portion to provide the fourth masked, reframed data block 73, and to "right" two data portions to provide the fifth masked, reframed data block 74, both of which may be attempted to be decoded but will also end in failure.

At this point, amount of shifts is five, which equals to the length, or size, of the mask 60, and thus, the method 200 may move the mask 60 to a different location such as second mask location 81, and shift the data portions following the middle of the mask 60 at the second location 81 two data portions to the "left," or towards the beginning of the data block, to provide the sixth masked, reframed data block 75 in FIG. 8. Similar as before, the sixth masked, reframed data block 75 may be attempted to be decoded 214 but will not be successful (since, e.g., the mask 60 is not position over the phase slip). The exemplary method 200 may iterate, shifting the data portions following the middle of the mask 60, similar to has described above with respect the first mask location 80 to provide masked, reframed data blocks 76, 77, 78, 79, each of which may be attempted to be decoded 214 but will not be successful.

Further, the method 200 may continue to move the mask to different mask locations iteratively along the data block until the masked, reframed data block is successfully decoded as depicted in FIG. 8. Ultimately, the mask 60 will be positioned at location 83, which covers the phase slip, and the third shift provides the eighteenth masked, reframed data block 99, which may be successfully decoded. More specifically, as shown, the mask length was five data portions, and the shift shown in the eighteenth masked, reframed data block 99 appropriately spaces the data portion 40 reference number 21 five data portions away from the data portion 40 reference number 15, which resulted in placing, or locating, the data portions beyond, or following, the middle of the mask 60 in their appropriate, or proper, locations such that decoding may be successful.

In other words, the exemplary systems, devices, and methods may be described as using buffered error recovery to buffer additional samples beyond the end of the data, identifying the location of the phase slip, positioning an erasure masks that is less than the max burst correction capability of the code graph, at the beginning of the buffered data, reframing the samples following the erasure mask, attempting to decode with each configuration, sliding the erasure mask position forward through the data by an amount that is less than the erasure mask size, and reframing and decoding the samples following the erasure mask after each shift of the erasure mask. The decoding will converge when the correct framing is found.

In the preceding description, reference is made to the accompanying set of drawings that form a part hereof and in which are shown by way of illustration several specific embodiments. It is to be understood that other embodiments are contemplated and may be made without departing from (e.g., still falling within) the scope or spirit of the present disclosure. The preceding detailed description, therefore, is not to be taken in a limiting sense. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g., 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Embodiments of the systems, devices, and methods for phase slip recovery are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present disclosure is limited only by the claims that follow.

What is claimed is:

1. A device comprising:
    a storage medium comprising a plurality of data blocks, wherein each of the data blocks comprises a plurality of data portions; and
    a controller comprising one or more processors, the controller operably coupled to the storage medium and configured to:
        read a plurality of data portions comprising a data block and at least one buffered data portion following the data block from the storage medium, the data block comprising a phase slip;
        identify the location of the phase slip within the data block;
        position a mask on one or more data portions within the data block including the location of the phase slip; and
        until the masked data block is decoded, perform the following:
            shift the plurality of data portions following the location of the phase slip to provide a masked, reframed data block, and
            attempt to decode the masked, reframed data block.

2. The device of claim 1, wherein the storage medium and the controller provide heat-assisted magnetic recording (HAMR).

3. The device of claim 1, wherein the mask is centered on one or more data portions within the data block to be centered about the location of the phase slip.

4. The device of claim 1, wherein the mask defines a size that is less than or equal to the burst correction ability of the controller.

5. The device of claim 1, wherein the shifting of the plurality of data portions following the location of the phase slip to provide a masked, reframed data block and the attempting to decode the masked, reframed data block comprises:
    shifting the plurality of data portions following the location of the phase slip to an initial shift location at the beginning of the mask to provide an initial masked, reframed data block and attempting to decode the initial masked, reframed data block; and
    until the masked, reframed data block is decoded, performing the following:
        shifting the plurality of data portions following the location of the phase slip to one or more subsequent shift locations that are different from the previous shift location to provide subsequent masked, reframed data blocks, and
        attempting to decode the subsequent masked, reframed data blocks.

6. The device of claim 5, wherein each of the one or more subsequent shift locations is one data portion away from the previous shift location.

7. The device of claim 1, wherein the data block is a sector.

8. A device comprising:
    a storage medium comprising a plurality of data blocks, wherein each of the data blocks comprises a plurality of data portions; and
    a controller comprising one or more processors, the controller operably coupled to the storage medium and configured to:
        read a plurality of data portions comprising a data block and at least one buffered data portion following the data block from the storage medium, the data block comprising a phase slip;
        position a mask on one or more data portions at one or more locations within the data block; and
        for each location that the mask is positioned, and until the masked data block is decoded or an amount of shifts exceeds the size of the mask, perform the following:
            shift the plurality of data portions following a middle of the mask to provide a masked, reframed data block, and
            attempt to decode the masked, reframed data block.

9. The device of claim 8, wherein the storage medium and the controller provide heat-assisted magnetic recording (HAMR).

10. The device of claim 8, wherein positioning the mask on one or more data portions at one or more locations within the data block comprises:
    positioning the mask on one or more data portions at an initial location within the data block; and
    positioning the mask on one or more data portions at a subsequent location different than the initial location within the data block until the masked, reframed data block is decoded.

11. The device of claim 8, wherein the mask defines a size that is less than or equal to the burst correction ability of the controller.

12. The device of claim 8, wherein the shifting of the plurality of data portions following a middle of the mask to provide a masked, reframed data block and the attempting to decode the masked, reframed data block comprises:
    shifting the plurality of data portions following the middle of the mask to an initial shift location at the beginning of the mask to provide an initial masked, reframed data block and attempting to decode the initial masked, reframed data block; and
    until the masked, reframed data block is decoded or the amount of shifts exceeds the size of the mask, performing the following:
        shifting the plurality of data portions following the middle of the mask to one or more subsequent shift locations that are different from the previous shift location to provide subsequent masked, reframed data blocks, and
        attempting to decode the subsequent masked, reframed data blocks.

13. The device of claim 12, wherein each of the one or more subsequent shift locations is one data portion away from the previous shift location.

14. The device of claim 8, wherein the data block is a sector.

15. A system comprising:
    a storage medium comprising a plurality of data blocks, wherein each of the data blocks comprises a plurality of data portions; and a controller comprising one or more processors, the controller operably coupled to the storage medium and configured to:
  read a plurality of data portions comprising a data block and at least one buffered data portion following the data block from the storage medium, the data block comprising a phase slip; and
  until the masked data block is decoded, perform the following:
    generate one or more masked, reframed data blocks based on the plurality of data portions, and
    attempt to decode each of the one or more masked, reframed data blocks until the masked, reframed data block is decoded.

16. The system of claim 15, wherein the storage medium and the controller provide heat-assisted magnetic recording (HAMR).

17. The system of claim 15, wherein generating one or more masked, reframed data blocks based on the plurality of data portions comprises:
  identifying the location of the phase slip within the data block;
  positioning a mask on one or more data portions within the data block including the location of the phase slip;
  shifting the plurality of data portions following the location of the phase slip to an initial shift location at the beginning of the mask to provide an initial masked, reframed data block; and
  until the masked, reframed data block is decoded, shifting the plurality of data portions following the location of the phase slip to one or more subsequent shift locations that are different from the previous shift location to provide subsequent masked, reframed data blocks.

18. The system of claim 15, wherein generating one or more masked, reframed data blocks based on the plurality of data portions comprises:
  positioning a mask on one or more data portions at an initial location within the data block to provide an initial masked, reframed data block;
  positioning the mask on one or more data portions at one or more subsequent locations different than the previous location within the data block to provide subsequent masked, reframed data blocks.

19. The system of claim 15, wherein generating one or more masked, reframed data blocks based on the plurality of data portions comprises:
  shifting the plurality of data portions following the middle of the mask to an initial shift location at the beginning of the mask to provide an initial masked, reframed data block; and
  shifting the plurality of data portions following the middle of the mask to one or more subsequent shift locations that are different from the previous shift location to provide subsequent masked, reframed data blocks.

20. The system of claim 15, wherein the data block is a sector.

* * * * *